United States Patent [19]
McCullough, Jr.

[11] Patent Number: 6,015,854
[45] Date of Patent: Jan. 18, 2000

[54] POLYPROPYLENE IMPACT COPOLYMERS WITH HIGH CLARITY

[75] Inventor: James Douglas McCullough, Jr., Houston, Tex.

[73] Assignee: Union Carbide Chemicals & Plastics Technology Corporation, Danbury, Conn.

[21] Appl. No.: 08/957,418

[22] Filed: Oct. 24, 1997

[51] Int. Cl.[7] ...................................................... C08J 5/36
[52] U.S. Cl. ......................... 524/396; 525/240; 525/244; 525/322; 525/324
[58] Field of Search .............................. 524/396; 525/88, 525/53, 240, 244, 322, 324

[56] References Cited

U.S. PATENT DOCUMENTS

| | | | |
|---|---|---|---|
| H1722 | 4/1998 | Goode et al. ............................. | 525/323 |
| 4,113,806 | 9/1978 | Watson et al. ....................... | 260/897 A |
| 4,514,534 | 4/1985 | DiNardo .................................. | 524/108 |
| 5,118,757 | 6/1992 | McCullough, Jr. ..................... | 525/322 |
| 5,258,464 | 11/1993 | McCullough, Jr. et al. ........... | 525/322 |
| 5,362,782 | 11/1994 | McCollough, Jr. et al. ........... | 524/108 |
| 5,674,630 | 10/1997 | Chatterjee ............................... | 525/322 |
| 5,712,344 | 1/1998 | McCullough, Jr. et al. ............. | 525/88 |
| 5,804,620 | 9/1998 | Amos ........................................ | 524/99 |

FOREIGN PATENT DOCUMENTS

| | | |
|---|---|---|
| 0353981 | 2/1990 | European Pat. Off. . |
| 0783024 | 7/1997 | European Pat. Off. . |

*Primary Examiner*—Robert Dawson
*Assistant Examiner*—D. Aylward
*Attorney, Agent, or Firm*—P. A. Doody

[57] ABSTRACT

The present invention teaches propylene-ethylene copolymers of about 5 to about 100 dg/min melt flow that have a homopolymer phase combined with a copolymer rubber phase in which the ethylene content of the rubber is between about 75 to about 95% w and a clarity of greater than 25%. The rubber content of the copolymer ranges between about 3% w to about 60% w. In addition to improved clarity, these copolymers have high stiffness (flexural modulus) and good falling weight impact toughness at low temperatures.

11 Claims, No Drawings

POLYPROPYLENE IMPACT COPOLYMERS WITH HIGH CLARITY

FIELD OF THE INVENTION

This invention relates to polypropylene impact copolymer compositions having improved clarity.

BACKGROUND OF THE INVENTION

Impact polypropylene has seen wide use over the years with many applications. For example, JP 08027238 discloses a high transparency composition through viscosity matching of an impact copolymer rubber phase with the homopolymer phase wherein the ethylene content of the rubber phase is 25–65 w %. Additionally, JP 08165385 discloses impact copolymers containing 0.1–10% w ethylene and a rubber phase containing 30–90% w ethylene.

However, the dispersed copolymer phase particles are believed to scatter light by virtue of their size, and this results in an observed haze, and so impact copolymers have been thought not to be useful where applications require clarity. Rather, random copolymers, i.e., single phase polypropylene with a comonomer, have been used for such purposes. These random copolymers, though, do not have the necessary physical properties for applications where impact copolymers are used normally.

U.S. Pat. No. 4,634,740 to Fujita et al. discloses a relatively clear composition having 65 to 95% w of propylene homopolymer and 5 to 35% w of an ethylene-propylene rubber with 70 to 85% w ethylene; however, said compositions are not in situ blends, but are physical blends having poor physical properties. EP 0 373 660 confirms the physical property problems of such compositions. Fortunately, the impact copolymers of this invention solve these problems in that they have good clarity, as well as good physical properties.

SUMMARY OF THE INVENTION

The present invention teaches propylene-ethylene impact copolymers of high clarity (>20%) of about 0.5 to about 100 dg/min melt flow that have a homopolymer phase combined with a copolymer rubber phase in which the ethylene content of the rubber ($E_c$) is between about 78% w to about 86% w. The rubber content of the copolymer ($F_c$) ranges between about 10% w to about 60% w.

DETAILED DESCRIPTION OF THE INVENTION

Composition

The homopolymer phase of the impact copolymer is preferably propylene homopolymer, but may contain up to 2% w of comonomer, preferably less than about 1% w, including but not limited to $C_2$, and $C_4$–$C_8$ alpha-olefins, such as 1-butene and ethylene and dienes, such as 5-ethylidene-2-norbonene and 7-methyl-1,6-octadiene.

The rubber phase in the impact copolymer is a copolymer of ethylene and propylene. The $E_c$ is between about 75% w to about 95% w, and more preferably about 78% w to about 86% w. In this $E_c$ range the rubber phase is at least moderately crystalline in terms of polyethyleneic-type crystallinity, yet it is not so crystalline as high density polyethylene (HDPE). The crystallinity of the rubber phase, $X_c$, is about 2 to 15% [$X_c$=100 H/Ho, where H is the measured heat of fusion and Ho is the heat of fusion of ideal 100% crystalline material as measured using standard differential scanning calorimetry methodology]. The desired level of ethylene can be determined by infrared analysis through conventional means, and the presence of polyethylenic-type crystallinity can be ascertained by virtue of strong absorption near or at 729 cm$^{-1}$ in the infrared spectrum, with C. Tosi and F. Ciampelli, "Applications of Infrared Spectroscopy to Ethylene-Propylene Copolymers," Advances in Polymer Science, vol. 12, p. 97, Springer-Verlag (1973) being an appropriate reference.

The crystallinity of the rubber phase also is reflected in its lack of solubility in a solvent such as hexane. Compositions of this invention have low solubilities in hexane. This is advantageous for food contacting during cooking (see FDA hexane extraction procedure under 21 CFR 177.1520). Allowing that very low levels of homopolymeric material are soluble in hexane, the hexane solubles (HS) level expressed as a percent of the rubber phase content by weight of the impact copolymer ($F_c$) is less than about 10% for the inventive compositions.

The rubber content by weight of the impact copolymer ($F_c$) ranges between about 10% w to about 60% w and preferably about 20% w to about 40% w and more preferably about 30% w to about 40% w. The melt flow (MF) of the copolymer is between about 0.5 to 100 dg/10 min, preferably about 2 to about 50 dg/10 min by either reactor or controlled rheology (visbreaking) modes. The ratio of intrinsic viscosity of the rubber phase to the homopolymer phase ("IVR" or $\beta/\alpha$) is about 1.3 to about 3.0, preferably about 1.4 to about 2.0.

$$\left(\beta/\alpha = 1 + \left[\frac{1}{F_c}\left[\frac{MF\ \text{homopolymer}}{MF\ \text{copolymer}}\right]^{0.213} - 1.0\right]\right)$$

The copolymers may be cracked (or visbroken) to achieve specific rheological properties (i.e., melt flows), though cracking may be detrimental to the clarity of the polymer. The cracking ratio, also termed MF ratio (i.e., the ratio of the melt flow of the cracked material to the melt flow of the uncracked material) should be about 2±0.5 because this ratio yields polymers with the best balance of clarity and stiffness. If the polymer is cracked beyond this ratio, the polymer loses too much clarity and flexural modulus retention is reduced.

However, when an impact copolymer which has a clarifying additive, such as MILLAD 3988 (Milliken) is cracked, unusual flexural modulus retention results in that the modulus often exceeds that of the uncracked parent impact copolymer when the cracking ratio is in this range of 2±0.5 and the Fc is between about 27 to 33% w. Visbroken polymers having moduli that exceed the parent flexural modulus previously have been unknown.

Said cracking may be accomplished with alkyl peroxides such as 2,5-dimethyl-2,5-bis(t-butylperoxy)hexane or other peroxidic species as are known to those of skill in the art.

Additives

Most preferably, the impact copolymers incorporate clarifying agents at levels of about 800 ppm to about 5,000 ppm (by weight), preferably about 1,200 ppm to about 4,000 ppm, and most preferably about 1,800 ppm to about 3,000 ppm. Of such clarifying agents, dibenzylidene sorbitol type clarifying agents are preferred, including, but not limited to, dibenzylidene sorbitol clarifiers having alkyl, alkoxy or halogen substituents on either or both aromatic rings, whereby the alkyl substituents can be C1 to C20, and may be branched, linear or cycloalkyl, and combinations of such sorbitol derivatives. Some specific examples of same are bis(3,5-dimethyl benzylidene) sorbitol, bis(p-ethyl benzylidene) sorbitol, bis(p-methyl benzylidene) sorbitol and combinations thereof. Such clarifying agents are commercially available as MILLAD® 3988 and 3940 from Milliken Chemical of Spartanburg, S.C., NC-4 from Mitsui Toatsu Chemicals, Inc. of Tokyo, Japan, Uniplex CX 45-56 from Unitex Chemical Corp., Greensboro, N.C.

The compositions of the invention also may contain additives which may be generally termed stabilizers, antioxidants, lubricants, acid acceptors, synergists, antistatic agents, nucleating additives and additives which stabilize against radiation, such as ultraviolet (UV) stabilizers and those that provide resistance to gamma irradiation. Antioxidants include the sub-classes of primary and secondary types; examples of primary antioxidants include the phenolic-type additives typified by IRGANOX 1010, IRGANOX 3114 and ETHANOX 330. Their main function is to provide long-term thermal stability such as is often needed in fabricated articles. Secondary antioxidants (or stabilizers) include those additives that contain phosphorus in either organo phosphite or organo phosphonite configurations. Examples of phosphites include IRGAFOS 168, ULTRANOX 626, ULTRANOX 627A, ULTRANOX 641, DOVERPHOS S-9228, ETHANOX 398 and IRGAFOS 12. Organo phosphonite secondary antioxidants are typified by P-EPQ. Other secondary antioxidants are exemplified by lower molecular weight phenolic-types such as BHT or IRGANOX 1076, or hydroxyl amines such as distearylhydroxyl amine. Secondary antioxidants function mainly by providing needed stability in melt flow and color during the melt processing of the plastic material. Another class of secondary antioxidants comprises the benzofuranone (lactone) derivatives as represented by Ciba Specialties' HP-136. Lubricants or mold release agents are typified by fatty acid amides, examples of which include ethylene bis stearamide, oleamide and erucamide. Acid acceptors may be categorized as salts of fatty acid, lactic acid salts and related derivatives, hydrotalcite-like compounds, and certain metal oxides. Examples of each type in order include calcium stearate, calcium lactate, DHT-4A, and zinc or magnesium oxide. Synergists enhance the performance of primary antioxidants. Examples include the thioesters of fatty acids typified by DSTDP, DLTDP and DMTDP. Anti-static agents enhance static decay on molded parts. Key examples include glyceryl monostearate and glyceryl distearate, as well as mixtures thereof Nucleating additives are typified by benzoic acid salts such as sodium, lithium or aluminum benzoate, minerals such as talc, and organo phosphorous salts such as NA-11 and MARK 2180. Ultraviolet stabilization is provided by light absorbers such as TINUVIN 327 or by hindered amine types such as CYASORB 3346, TINUVIN 622, TINUVIN 770 DF and CHIMASSORB 944. Resistance against gamma irradiation is provided by combinations of additives such as phosphorous containing secondary antioxidants or the lactone type (e.g. HB-136), and hindered amines. Additionally, Milliken's RS 200 additive is of benefit, as are mobilizing additives such as mineral oil (cited in U.S. Pat. Nos. 4,110,185 and 4,274,932). The latter is used in combination with a non-phenolic secondary antioxidant and a hindered amine.

Preferred antioxidants include 1,3,5-trimethyl-2,4,6-tris (3,5-di-tert-butyl-4-hydroxy-benzyl) benzene (A); octadecyl 3-(3',5'-di'tert'butyl-4'-hydroxyphenyl) propionate (B); tetrakis[methylene (3,5-di-tert-butyl-4-hydroxyhydrocinnamate)]methane (C); tris[3,5-di-t-butyl-4-hydroxybenzyl) isocyanurate (D); 3,5-di-tert-butyl-4-hydroxyhydrocinnamic acid triester with 1,3,5-tris(2-hydroxyethyl)-s-triazine-2,4,6(1H,3H,5H)-trione (E); 1,3,5-tris-(4-tert-butyl-3-hydroxy-2,6-dimethylbenzyl) 1,3,5-triazine-2,4,6-(1H,3H,5H)-trione (F); bis-[3,3-bis (4'hydroxy-3'tert-butyl-phenyl)-butanoic acid]-glycolester (G); 2,2'-methylene-bis-(4-methyl-6-tertiary-butylphenol)-terephthalate (H); and 2,2 bis[4-(2-(3,5-di-tert-butyl-4-hydroxyhydrocinnamoyloxy)) ethoxy-phenyl]propane (I); calcium bis [monoethyl(3,5-di-tert-butyl-4-hydroxybenzyl) phosphonate](J); 1,2-bis(3,5-di-tert-butyl-4-hydroxyhydrocinnamoyl)hydrazine (K); and 2,2-oxamido bis[ethyl 3-(3,5-di-tert-butyl-4-hydroxyphenyl)propionate] (L).

Additional additives may be used separately or blended with the above listed antioxidants. This applies to all the above additive types and further includes fillers like barium sulfate, clays, calcium carbonate, silicates, pigments, such as titanium dioxide, zinc oxide, lead chromate, cadmium sulfides, cadmium selenide, zinc sulfide, basic carbonate of white lead; stabilizers such as tribasic lead sulfate, basic lead chlorosilicate, dibutyl tin oxide and other salts of lead, zinc, cadmium, tin, and the like; flame retardants such as antimony oxide; ultra-violet stabilizers, slip agents, anti-block agents, and other solid additives which enhance the properties and processability of the impact copolymer to which they are added.

While the above listing seeks to provide key examples of the different additive types, it is not to be viewed as limited by the examples in scope. It is also recognized that certain of the above additives are multi-functional, e.g., an acid acceptor such as calcium stearate may also provide mold release performance, as may also be the case with glyceryl monostearate. Further, combinations of any or all types of additives given, or of additives within a given class, are considered to be within the scope of the present invention.

Properties

The impact copolymers of this invention have clarity measurements of greater than about 20%, more preferably greater than 30%, with clarifying agent present, as measured according to ASTM D 1746-92 on injection molded plaques having a thickness of 1.0 to 1.2 mm and an edge length of 10 cm. The mold surfaces should be clean and free of imperfections that may have an adverse effect on the clarity of plaques molded from it. Non-visbroken and clarified impact copolymers have a clarity of greater than 25%, preferably greater than 35%, and most preferably a clarity of greater than 45%.

Surprisingly, the copolymers have low, i.e., <2.6% w, hexane extractables at 50° C. as tested pursuant to 21 CFR 177.1520. Thus, these copolymers may be used in food contact applications involving cooking. As has been stated, the hexane soluble level expressed as a percent of Fc is less than 10% for the inventive copolymers.

With a clarifying agent present, the stiffness of the copolymer as may be measured by the flexural modulus (ASTM D 790A) suffers a decline of less than 12% when the copolymer is visbroken as long as the cracking ratio is less than about four (though preferably a ratio of about two is used as mentioned previously). It can be said similarly that heat deflection temperature (ASTM D 648), an independent measure of flexural modulus (see I. I. Rubin, SPE Monograph: Injection Molding Theory and Practice, John Wiley & Sons, NY, 1972, p. 355), is substantially retained by the visbroken materials of the invention. Moreover, in the preferred range for cracking ratio (2±0.5), the heat deflection temperature of the visbroken product is frequently greater than that of the uncracked base material.

In addition to improved clarity, these copolymers have high stiffness (flexural modulus) and good falling weight impact toughness at low temperatures. While random propylene-ethylene copolymers have a Gardner impact strength at −30° C. of nil (with catastrophic failure), the inventive copolymers with added clarifier have good impact toughness of about 15 J or better for melt flows up to about 20 dg/min (ASTM D5420, Method GC, ring in; 63.5 mm diameter by 3.2 mm thick disk).

Utility

The copolymers of the present invention may be used in any standard molded products in which similar polyolefin resins and polypropylene impact copolymers are used. However, the added advantage of clarity expands this range of utility over standard impact copolymers, such that the impact copolymers of the present invention can be used in food containers, drinking cups, water bottles, medical devices and toys where the need for clarity restricts use to either random propylene-ethylene copolymers of inherently lower toughness or to other polymers such as polycarbonate, which while tough, are several times more expensive. The need for toughness at freezer temperatures, combined with stiffness and clarity at lower cost is met by materials of this invention. The low hot hexane solubles content enables the copolymers to be used for cooking applications. The microwavability facilitates use in cooking, and the resistance to steam autoclaving or to gamma irradiation of the present copolymers allows them to be sterilized for medical uses.

Manufacture

Impact polypropylene copolymers can be produced in slurry polymerization processes conducted in inert hydrocarbon solvents, bulk polymerization processes conducted in liquefied monomers such as liquefied propylene, and in gas phase polymerization processes. Gas phase processes with a fluidized bed are preferable, especially a two reactor system wherein the homopolymer phase is made in the first reactor and the copolymer rubber phase in the second reactor. Such a process provides for in situ blending of the rubber and homopolymer phases, which is necessary, as compared to a physical blending of the homopolymer and copolymer rubber phases which does not produce a copolymer of the present invention.

Without gas phase technology, the preparation of the materials of this invention would not be practicable commercially because of the large amounts of propylene monomer present in the bulk or liquid monomer slurry process. That monomer must be removed to achieve the desired high ethylene contents in the reaction product in the second reactor. With a diluent process, propylene would be dissolved in the diluent within the first reactor, and portions of the diluent would have to be removed to purge the system of much of the propylene prior to the introduction of the first stage polymer and catalyst species into the second reactor.

The catalysts for use in such systems include:

A. Ziegler-Natta catalysts, including titanium based catalysts such as those described in U.S. Pat. Nos. 4,376,062, 4,379,758 and 5,066,737. Ziegler-Natta catalysts are typically are magnesium/titanium/electron donor complexes used in conjunction with an organoaluminum cocatalyst and an external selectivity control agent such as an aromatic carboxylic acid ester or an alkoxy silane.

B. Chromium based catalysts such as those described in U.S. Pat. Nos. 3,709,853; 3,709,954; and 4,077,904.

C. Vanadium based catalysts such as vanadium oxychloride and vanadium acetylacetonate, such as described in U.S. Pat. No. 5,317,036.

D. Cationic forms of metal halides, such as aluminum trihalides.

E. Cobalt catalysts and mixtures thereof such as those described in U.S. Pat. Nos. 4,472,559 and 4,182,814.

F. Nickel catalysts and mixtures thereof such as those described in U.S. Pat. Nos. 4,155,880 and 4,102,817.

G. Rare Earth metal catalysts, i.e., those containing a metal having an atomic number in the Periodic Table of 57 to 103, such as compounds of cerium, lanthanum, praseodymium, gadolinium and neodymium.

H. Metallocene catalysts, i.e., organometallic coordination complexes of one or more ligands in association with a metal atom, including, but not limited to, single site catalysts.

In accordance with the process, discrete portions of the catalyst components are continually fed to the reactor in catalytically effective amounts together with the propylene (and possible comonomer) while the polymer product is continually removed during the continuing process. Fluid bed reactors useful for this purpose are described, e.g., in U.S. Pat. Nos. 4,302,565, 4,302,566 and 4,303,771. It is preferable to operate same in condensing mode, induced condensing mode or liquid monomer mode.

For example, in the first reactor propylene or a mixture of propylene and, optionally, at least one olefin having 2 to 8 carbon atoms is introduced together with hydrogen and catalyst into the first reactor. The mole ratio of hydrogen to propylene alone or combined propylene and olefin is in the range of about 0.001 to about 0.45 and is preferably about 0.004 to about 0.1.

A mixture of homopolymer or copolymer of propylene with active catalyst embedded in the polymer matrix is produced in the first reactor. This mixture from the first reactor is transferred to the second reactor to which no additional solid catalyst need be added. Additional cocatalyst and/or electron donor optionally may be added to the second reactor. In the second reactor, for example, ethylene and propylene are maintained at a gas phase composition in a range of mole ratio of about 0.1 to about 10 moles of ethylene per mole of propylene, and preferably about 0.1 to about 5.0 moles of ethylene per mole of propylene. Such a process would create an in situ blend of the homopolymer and the rubber.

EXAMPLES

Example 1

All polymers included in the Examples were manufactured in two sequential fluidized bed gas phase reactors. The catalyst used was $TiCl_4$ supported on $MgCl_2$ with triethylaluminum cocatalyst, diisobutyl phthalate as an internal electron donor and n-propyl-trimethoxysilane as the external electron donor. The resulting propylene-ethylene copolymers were treated with wet nitrogen and collected as powders. All copolymers had IVR's of about 1.4. The copolymers had nominal melt flows of about 6 to 7 dg/min. The $E_c$ and $F_c$ are noted in Table 1 below. The copolymers were stabilized by dry mixing into the powder the following additives:

| ADDITIVE | LEVEL ppmw |
| --- | --- |
| Calcium Stearate | 500 |
| DHT-4A (hydrotalcite-like material) | 200 |
| I-3114 (primary antioxidant) | 500 |
| SANDOSTAB ® P-EPQ (phosphonate) | 800 |
| MYVEROL 18-06 (glycerol monostearate) | 3,000 |

In a second dry blending step, 2,000 ppm of MILLAD 3988 clarifying agent was added to certain samples. These copolymers were extruded on a 30 mm twin-screw Werner & Pfliederer twin-screw extruder under nitrogen purging.

TABLE 1

COPOLYMER PROPERTIES

| SAMPLE # | Et, % w | Ec, % w | Fc, % w |
|---|---|---|---|
| 32-6 | 22 | 82 | 27 |
| 43-6 | 25 | 83 | 30 |
| 186-6 | 27 | 82 | 33 |
| 192-6 | 28 | 81 | 34 |

Samples of each copolymer were visbroken with 2,5-dimethyl-2,5-bis(t-butylperoxy)hexane (commercially available from Atochem as LUPERSOL 101) to nominally 12 and 20 dg/min melt flows. Injection moldings were conducted on an Arburg Model 221-55-250 reciprocating screw, 25 ton clamp, injection molder, using ASTM molding conditions. Standard ASTM specimens and testing conditions were used for tabulated test data except that the measure of stress whitening involves an ASTM method variant. Clarity and gloss (45 degrees) were measured on 10 cm×10 cm, 1–1.2 mm thick injection molded plaques.

Properties were measured after two weeks minimum elapsed time after molding. In all cases, unclarified samples are identified by a sample number and the approximate melt flow. Clarified copolymers are denoted with an "A". Cracked materials have the same sample number as the originating polymer, but the nominal melt flow of the cracked material is noted after the dash.

The clarity results for the test materials are given in Table 2. The measurements were in accord with ASTM D1746-92, with the results reported as percent regular transmittance. The results show that clarity was improved generally by adding clarifying agent, reducing the degree of crack and reducing $F_c$. However, in the desirable cracking range for modulus retention (MF Ratio=2±0.5), it is seen that higher Fc sample, 43-12, has better clarity than sample 32-12 (each clarity value shown in Table 2 is the average of five individual measurements).

TABLE 2

| Sample No. | Clarity | Gloss |
|---|---|---|
| 32-6 | 29.3 | 56.2 |
| 32-12 | 12.1 | 52.2 |
| 32-20 | 11.5 | 47.9 |
| 43-6 | 32.0 | 52.0 |
| 43-12 | 14.8 | 50.1 |
| 43-20 | 11.4 | 47.2 |
| 188-6 | 30.3 | 49.6 |
| 188-12 | 14.3 | 49.0 |
| 188-20 | 12.7 | 43.3 |
| 192-6 | 30.4 | 50.9 |
| 192-12 | 16.7 | 51.2 |
| 192-20 | 12.9 | 47.1 |
| 32-6-A | 55.5 | 57.8 |
| 32-12-A | 35.1 | 47.6 |
| 32-20-A | 29.6 | 48.5 |
| 43-6-A | 53.1 | 58.4 |
| 43-12-A | 36.8 | 50.1 |
| 43-20-A | 22.7 | 43.5 |
| 188-6-A | 49.6 | 50.2 |
| 188-12-A | 31.0 | 46.8 |
| 188-20-A | 11.4 | 43.2 |
| 192-6-A | 37.5 | 45.3 |
| 192-12-A | 26.5 | 44.3 |
| 192-20-A | 16.7 | 42.7 |
| CTRL-1 | 0.7 | 48.3 |
| CTRL-2 | 0.9 | 49.0 |

As a comparison, clarity values measured at various times on like molded plaques (i.e., one phase systems) for three commercially sold random copolymers are as follows:

TABLE 3

| | | |
|---|---|---|
| Unclarified Random Copolymer: | 46.8% | 46.6% |
| Clarified Random Copolymer I: | 24.6% | 45.0% |
| Clarified Random Copolymer II: | 52.1% | 69.1% |

Clarification in the above instances is with MILLAD 3905 at 2,000 ppmw. The clarity values for the clarified random copolymers span those of the unclarified random copolymer. With unclarified impact copolymers of the invention, an opposite effect (clarity generally improved with increasing $F_c$) was seen with visbroken samples, although visbreaking again had an adverse affect on clarity. The controls, denoted CTRL-1 and CTRL-2, are conventional impact copolymers, most notably with $E_c$ values of about 60% w, and neither of which is clarified. It is seen that they, like other conventional impact copolymers, are opaque in molded sections.

The clarity results showed that unclarified materials of the invention have good clarity in comparison to conventional impact copolymers, and the addition of a dibenzylidene sorbitol derivative as a clarifying agent greatly improved clarity to a point where the clarity is comparable to that of random copolymers.

Table 2 also gives gloss results (45 degrees) for the test materials. Gloss tended to drop off with visbreaking whether product was clarified or not. Values were close to the control samples, and often were better. Visbreaking provides a tool for gloss adjustment.

The stress whitening results for the test materials are given in Table 4. Testing was done conventionally with a Gardner impact rig at 10 and 20 in-lb (1.13 and 2.26 J) of impact with three measurements at each energy level for each sample. Visbreaking increased stress whitening and clarification tended to reduce it. Stress whitening increased with $F_c$ with either unclarified or clarified samples, although sample 43 broke that trend. Moderate visbreaking brought stress whitening nearer the two control materials, but still improved relative to them.

TABLE 4

| Sample No. | Blush (mm) at 1.13 J | Blush (mm) at 2.26 J |
|---|---|---|
| 32-6 | 9.49 | 12.13 |
| 32-12 | 13.25 | 17.31 |
| 32-20 | 15.90 | 19.63 |
| 43-6 | 8.31 | 11.56 |
| 43-12 | 11.99 | 15.85 |
| 43-20 | 15.96 | 17.81 |
| 188-6 | 10.01 | 13.22 |
| 188-12 | 13.69 | 17.28 |
| 188-20 | 17.60 | 23.06 |
| 192-6 | 9.21 | 12.93 |
| 192-12 | 14.09 | 16.41 |
| 192-20 | 18.02 | 20.88 |
| 32-6-A | 8.45 | 12.05 |
| 32-12-A | 11.37 | 13.63 |
| 32-20-A | 13.60 | 17.25 |
| 43-6-A | 7.28 | 11.06 |
| 43-12-A | 9.01 | 11.11 |
| 43-20-A | 12.27 | 15.59 |
| 188-6-A | 8.79 | 11.25 |
| 188-12-A | 11.65 | 14.96 |
| 188-20-A | 15.52 | 18.74 |
| 192-6-A | 9.72 | 12.88 |
| 192-12-A | 12.91 | 17.49 |
| 192-20-A | 18.36 | 21.29 |
| CTRL-1 | 17.52 | 20.79 |
| CTRL-2 | 17.86 | 21.57 |

Mechanical properties for the test materials are given in Tables 5–8 where in each table direct comparisons are made between unclarified and clarified materials. Table 9 includes two reference controls for comparative purposes. The properties related to stiffness in bending, including flexural modulus and heat deflection temperature suffered little loss, if any, on visbreaking for the clarified samples. With appropriate clarification in accord with this invention, stiffness properties are maintained over some degree of visbreaking. A cracking ratio of about 1.5 to two times the original melt flow is close to highest visbroken product stiffness properties.

Regarding other properties, uncracked and unclarified impact copolymer showed a strong effect of $F_c$ on notched Izod at room temperature, but Gardner at −30° C. and notched Izod at −20° C. appeared to plateau with sample 43, at an $F_c$ of 30.5% w. With visbreaking unclarified products, the effect on room temperature Izod was melt flow dependent, with Izod increasing with $F_c$ at ~12 dg/min, but remaining in about the same range at ~20 dg/min. With Gardner, there was no significant improvement with $F_c$ associated with visbreaking, and the values got worse with increasing melt flow. For these materials, the tensile elongation to break decreased with visbreaking to just under 20% for all the ~20 dg/min melt flow unclarified test materials.

For the clarified and uncracked products, increasing Fc generally improved Izod at either temperature and Gardner impact as well. With cracking, the clarified samples showed a general directional dependence of Izod on Fc at both temperatures but Gardner impact plateaued with sample 43 at both ~12 and ~20 dg/min melt flow. It is noteworthy that the Gardner impact was much higher at 20 dg/min with clarification than without it. With clarification, tensile elongation to break values ran lower than without it. At ~12 dg/min, tensile break elongations were about 12–17%, and at ~20 dg/min they were about 9–11%.

TABLE 5
MECHANICAL PROPERTIES FOR SAMPLE 32

| SAMPLE IDENTIFICATION | 32-6 | 32-12 | 32-20 | 32-6-A | 32-12A | 32-20A |
|---|---|---|---|---|---|---|
| Melt Flow, dg/min | 7.06 | 13.31 | 22.84 | 7.13 | 13.27 | 22.64 |
| MF Ratio | — | 1.89 | 3.24 | — | 1.86 | 3.18 |
| Tensile Props., 51 mm/min | | | | | | |
| Yield Strength, MPa | 29.5 | 27.6 | 26.0 | 31.6 | 31.7 | 29.9 |
| Yield Elongation, % | 7.78 | 6.70 | 5.42 | 7.03 | 5.30 | 4.62 |
| Break Strength, MPa | 17.8 | 21.1 | 19.7 | 14.4 | 22.2 | 25.2 |
| Break Elongation, % | 81.48 | 41.04 | 17.99 | 58.51 | 12.44 | 9.32 |
| Flex. Mod., 1.3 mm/min | | | | | | |
| 1% Secant Mod., MPa | 1,256 | 1,154 | 1,108 | 1,479 | 1,519 | 1,472 |
| Mod. Retention, % | — | 91.88 | 88.22 | — | 102.70 | 99.53 |
| Tangent Mod., MPa | 1,303 | 1,196 | 1,144 | 1,532 | 1,579 | 1,507 |
| Mod. Retention, % | — | 91.79 | 87.80 | — | 103.07 | 98.37 |
| Izod Impact, J/m | | | | | | |
| Notched Izod, 23° C. | 58.2 | 43.7 | 47.5 | 76.8 | 57.1 | 46.4 |
| Notched Izod, −20° C. | 27.2 | 30.4 | 32.5 | 32.5 | 33.1 | 32.5 |
| Gardner, J, −30° C. | 18.1 | 15.1 | 7.66 | 19.5 | 17.2 | 14.5 |
| Heat Deflection Temp, ° C., 455 kPa loading | 93.0 | 92.0 | 94.0 | 101 | 105 | 106 |

TABLE 6
MECHANICAL PROPERTIES FOR SAMPLE 43

| SAMPLE IDENTIFICATION | 43-6 | 43-12 | 43-20 | 43-6A | 43-12A | 43-20A |
|---|---|---|---|---|---|---|
| Melt Flow, dg/min | 7.47 | 11.49 | 18.73 | 6.93 | 11.25 | 19.70 |
| MF Ratio | — | 1.54 | 2.51 | — | 1.62 | 2.77 |
| Tensile Props., 51 mm/min | | | | | | |
| Yield Strength, MPa | 28.4 | 26.6 | 24.7 | 30.3 | 29.1 | 28.0 |
| Yield Elongation, % | 8.02 | 7.33 | 5.57 | 7.70 | 5.83 | 5.09 |
| Break Strength, MPa | 17.4 | 16.9 | 19.6 | 19.3 | 21.2 | 24.1 |
| Break Elongation, % | 92.49 | 34.93 | 17.01 | 42.22 | 16.42 | 10.47 |
| Flex. Mod., 1.3 mm/min | | | | | | |
| 1% Secant Mod., MPa | 1,200 | 1,110 | 1,044 | 1,374 | 1,442 | 1,376 |
| Mod. Retention, % | — | 92.50 | 87.00 | — | 104.95 | 100.15 |
| Tangent Mod., MPa | 1,244 | 1,148 | 1,068 | 1,423 | 1,500 | 1,425 |
| Mod. Retention, % | — | 92.28 | 85.85 | — | 105.41 | 100.14 |
| Izod Impact, J/m | | | | | | |
| Notched Izod, 23° C. | 76.3 | 59.2 | 44.3 | 126 | 71.5 | 51.2 |
| Notched Izod, −20° C. | 32.0 | 35.2 | 33.1 | 32.5 | 35.7 | 37.3 |
| Gardner, J, −30° C. | 25.3 | 18.2 | 3.86 | 26.1 | 21.2 | 15.1 |
| Heat Deflection Temp, ° C., 455 kPa loading | 95.0 | 91.0 | 89.0 | 98.0 | 102 | 100 |

TABLE 7
MECHANICAL PROPERTIES FOR SAMPLE 188

| SAMPLE IDENTIFICATION | 188-6 | 188-12 | 188-20 | 188-6A | 188-12A | 188-20A |
|---|---|---|---|---|---|---|
| Melt Flow, dg/min | 6.68 | 10.78 | 16.64 | 6.82 | 10.77 | 16.82 |
| MF Ratio | — | 1.61 | 2.49 | — | 1.58 | 2.47 |
| Tensile Props., 51 mm/min | | | | | | |
| Yield Strength, MPa | 26.5 | 24.5 | 22.8 | 28.1 | 27.6 | 26.0 |
| Yield Elongation, % | 8.21 | 6.82 | 4.97 | 7.61 | 5.52 | 4.51 |
| Break Strength, MPa | 18.5 | 16.4 | 18.2 | 17.7 | 19.2 | 22.4 |
| Break Elongation, % | 160.9 | 52.28 | 19.24 | 58.57 | 14.59 | 9.95 |
| Flex. Mod., 1.3 mm/min | | | | | | |
| 1% Secant Mod., MPa | 1,141 | 1,048 | 998.1 | 1,340 | 1,372 | 1,298 |
| Mod. Retention, % | — | 91.85 | 87.48 | — | 102.39 | 96.87 |
| Tangent Mod., MPa | 1,183 | 1,087 | 1,028 | 1,397 | 1,429 | 1,349 |
| Mod. Retention, % | — | 91.89 | 86.90 | — | 102.29 | 96.56 |
| Izod Impact, J/m | | | | | | |
| Notched Izod, 23° C. | 101 | 73.1 | 49.6 | 224 | 93.4 | 57.6 |
| Notched Izod, −20° C. | 33.6 | 38.9 | 36.8 | 45.3 | 48.0 | 46.4 |
| Gardner, J, −30° C. | 25.5 | 15.5 | 6.71 | 27.0 | 19.2 | 15.1 |
| Heat Deflection Temp, ° C., 455 kPa loading | 87.0 | 86.0 | 89.0 | 92.0 | 104 | 103 |

TABLE 8
MECHANICAL PROPERTIES FOR SAMPLE 192

| SAMPLE IDENTIFICATION | 192-6 | 192-12 | 192-20 | 192-6A | 192-12A | 192-20A |
|---|---|---|---|---|---|---|
| Melt Flow, dg/min | 7.27 | 11.01 | 16.08 | 6.85 | 11.23 | 17.32 |
| MF Ratio | — | 1.51 | 2.21 | — | 1.64 | 2.53 |
| Tensile Props., 51 mm/min | | | | | | |
| Yield Strength, MPa | 26.5 | 24.9 | 22.8 | 27.3 | 25.6 | 23.9 |
| Yield Elongation, % | 8.50 | 6.81 | 5.03 | 8.12 | 6.29 | 4.72 |
| Break Strength, MPa | 18.2 | 16.6 | 18.2 | 17.4 | 18.1 | 20.0 |
| Break Elongation, % | 164.1 | 23.47 | 17.95 | 79.28 | 16.97 | 10.72 |
| Flex. Mod., 1.3 mm/min | | | | | | |
| 1% Secant Mod., MPa | 1,144 | 1,074 | 1,019 | 1,241 | 1,141 | 1,093 |
| Mod. Retention, % | — | 93.88 | 89.07 | — | 91.94 | 88.07 |
| Tangent Mod., MPa | 1,192 | 1,105 | 1,055 | 1,293 | 1,183 | 1,124 |

TABLE 8-continued

MECHANICAL PROPERTIES FOR SAMPLE 192

| SAMPLE IDENTIFICATION | 192-6 | 192-12 | 192-20 | 192-6A | 192-12A | 192-20A |
|---|---|---|---|---|---|---|
| Mod. Retention, % | — | 92.70 | 88.51 | — | 91.49 | 86.93 |
| Izod Impact, J/m | | | | | | |
| Notched Izod, 23° C. | 114 | 74.7 | 49.6 | 186 | 82.7 | 52.8 |
| Notched Izod, −20° C. | 34.1 | 35.2 | 38.9 | 37.3 | 47.5 | 41.1 |
| Gardner, J, −30° C. | 24.2 | 16.5 | 10.5 | 27.3 | 19.8 | 14.8 |
| Heat Deflection Temp, ° C., 455 kPa loading | 90.0 | 89.0 | 87.0 | 100 | 98.0 | 96.0 |

TABLE 9

MECHANICAL PROPERTIES FOR CONTROLS

| SAMPLE IDENTIFICATION (Visbroken grades) | CTRL-1 | CTRL-2 |
|---|---|---|
| Melt Flow, dg/min | ~8 | ~12 |
| Tensile Props., 51 mm/min | | |
| Yield Strength, MPa | 25.0 | 26.8 |
| Yield Elongation, % | 6.95 | 5.86 |
| Break Strength, MPa | 17.8 | 17.4 |
| Break Elongation, % | 253 | 146 |
| Flex. Mod., 1.3 mm/min | | |
| 1% Secant Mod., MPa | 1,098 | 1,183 |
| Tangent Mod., MPa | 1,138 | 1,219 |
| Izod Impact, J/m | | |
| Notched Izod, 23° C. | 105 | 67.2 |
| Notched Izod, −20° C. | 55.0 | 41.6 |
| Gardner, J, −30° C. | 20.6 | 17.7 |
| Heat Deflection Temp, ° C., 455 kPa loading | 91.0 | 98.0 |

Example 2

In this Example the effect of degree of visbreaking on the change in stiffness was measured. The measure of stiffness used was the 1% secant flexural modulus. The preparation of the copolymers, their extrusion and molding into test parts were as in Example I. The stabilizers used were:

| ADDITIVE | LEVEL ppmw |
|---|---|
| DHT-4A | 400 |
| I-3114 | 1,000 |
| P-EPQ | 1,000 |
| Acrawax C (ethylene bis stearamide) | 500 |

The base stabilizers were blended into the copolymers, which with addition of nucleant/clarifying agent in a second blend step, with or without calcium stearate, completed the formulation of six compositions. Compositions of the two base copolymers are given in Table 10. Sample identification is by series and sample in the series, e.g. sample 1-1 is the first sample of the first series, and sample 3-4 is the fourth sample of the third series. In the two instances described, sample 1-1 is a base material, while sample 3-4 is the highest visbroken stage for the given series.

TABLE 10

BASE MATERIAL PROPERTIES

| SAMPLE # | Et, % w | Ec, % w | Fc, % w |
|---|---|---|---|
| 1-1 | 20 | 83 | 24 |
| 2-1 (Comparative) | 9 | 61 | 15 |

The finished extruded compositions, including visbroken materials, are included in Table 11. MILLAD 3988 clarifying agent at 2,000 ppmw was compared to sodium benzoate nucleating agent at 500 ppmw. Run 1-1 had an IVR of about 1.2 to 1.3. Visbreaking was conducted with LUPERSOL 101 peroxide. The level of peroxide used varied depending on desired product melt flow and the starting melt flow.

The results of testing in Table 11 show that modulus retention was best with impact copolymers of the invention combined with MILLAD 3988, and with a cracking ratio approaching 2, the modulus retention was best for these materials. While no reversals in stiffness were seen (visbroken value higher than the base value), the base value was closely approached with sample 3-3. The results also show that MILLAD 3988 provided better stiffness retention than sodium benzoate, and the latter was better in the absence of calcium stearate.

TABLE 11

EFFECTS OF NUCLEATION/CLARIFICATION ON MODULUS RETENTION WITH VISBREAKING

| SAMPLE IDENTIFICATION | Series 1 | Series 2 | Series 3 | Series 4 | Series 5 | Series 6 |
|---|---|---|---|---|---|---|
| Base Polymer | Drum 29 | CTRL-3 | Drum 29 | CTRL-3 | CTRL-3 | CTRL-3 |
| Millad 3988, ppmw | — | — | 2,000 | 2,000 | — | — |
| Sodium Benzoate, ppmw | — | — | — | — | 500 | 500 |
| Calcium Stearate, ppmw | 500 | 500 | 500 | 500 | — | 500 |
| Uncracked (Sample #) | 1-1 | 2-1 | 3-1 | 4-1 | 5-1 | 6-1 |
| Melt Flow, dg/min | 8.61 | 4.53 | 9.37 | 4.57 | 4.60 | 4.58 |
| 1% Sec. Flex. Mod., MPa* | 1,134 | 1,270 | 1,349 | 1,523 | 1,402 | 1,325 |
| CR-1 (Sample #) | 1-2 | 2-2 | 3-2 | 4-2 | 5-2 | 6-2 |
| Melt Flow, dg/min | 12.51 | 7.16 | 12.55 | 5.83 | 6.59 | 6.46 |
| MF ratio | 1.45 | 1.58 | 1.34 | 1.28 | 1.43 | 1.41 |
| 1% Sec. Flex. Mod., MPa | 1,080 | 1,133 | 1,307 | 1,460 | 1,322 | 1,225 |
| Mod. Retention, % | 95.24 | 89.21 | 96.90 | 95.86 | 94.29 | 92.45 |
| CR-2 (Sample #) | 1-3 | 2-3 | 3-3 | 4-3 | 5-3 | 6-3 |
| Melt Flow, dg/min | 14.78 | 14.49 | 15.57 | 14.63 | 14.64 | 14.62 |
| MF ratio | 1.72 | 3.20 | 1.66 | 3.20 | 3.18 | 3.19 |

TABLE 11-continued

EFFECTS OF NUCLEATION/CLARIFICATION ON MODULUS RETENTION WITH VISBREAKING

| SAMPLE IDENTIFICATION | Series 1 | Series 2 | Series 3 | Series 4 | Series 5 | Series 6 |
|---|---|---|---|---|---|---|
| 1% Sec. Flex. Mod., MPa | 1,056 | 1,106 | 1,316 | 1,417 | 1,286 | 1,165 |
| Mod. Retention, % | 93.12 | 87.09 | 97.55 | 93.04 | 91.3 | 87.92 |
| CR-3(Sample #) | 1-4 | 2-4 | 3-4 | 4-4 | 5-4 | 6-4 |
| Melt Flow, dg/min | 22.81 | 16.76 | 24.90 | 16.23 | 17.14 | 16.12 |
| MF ratio | 2.65 | 3.70 | 2.66 | 3.55 | 3.72 | 3.52 |
| 1% Sec. Flex. Mod., MPa | 1,019 | 1,098 | 1,279 | 1,433 | 1,272 | 1,181 |
| Mod. Retention, % | 89.86 | 86.46 | 94.81 | 94.09 | 90.73 | 89.13 |

*Flexural modulus tested at 1.3 mm/min.

Example 3

Three impact copolymers of the invention (IVR's ~1.3–1.5) were extruded into thin cast films of 3–5 mils (0.076–0.13 mm) in thickness for FDA hexane solubles extractions (abbreviated here as "HS"). These materials were first extruded into pellets on a 1¼ inch (3.2 cm) screw diameter (with mixing section), Brabender single-screw extruder. The additives were as follows:

| ADDITIVE | LEVEL (ppm) |
|---|---|
| I-3114 | 1,000 |
| I-168 | 1,000 |
| Myverol 18-06 | 3,000 |
| DHT-4A | 800 |

Melt flows and compositional information for the impact copolymers were as shown in Table 12.

TABLE 12

| SAMPLE # | MELT FLOW, dg/min | Et, % w | Ec, % w | Fc, % w |
|---|---|---|---|---|
| 3 | 12.2 | 24.9 | 84.8 | 29.3 |
| 6 | 7.0 | 23.4 | 84.6 | 27.7 |
| 13* | 11.0 | 23.2 | 84.4 | 27.5 |

*Visbroken from sample 6.

Cast films were prepared on a ¾ inch (1.9 cm) screw diameter Brabender single-screw extruder with a melt temperature of 230° C. and at 60–70 rpm. Appropriate samples of the collected films were subjected to the FDA extraction procedure (21 CFR 177.1520). The results were as follows:

| SAMPLE | HS, % w* | 100HS/Fc |
|---|---|---|
| 3 | 1.8 | 6.1 |
| 6 | 1.6 | 5.8 |
| 13 | 1.5 | 5.4 |

*Allowed maximum of 2.6% w at 50° C. for cooking.

The materials of this invention fell within the acceptable maximum soluble content for cooking applications of 2.6% w. The slightly lower solubles content of the visbroken product may be related to a low level of crosslinking in the rubber phase.

Comparative data for conventional impact copolymers obtained from prior testing under analogous conditions is as follows:

| SAMPLE No. | MF (dg/min) | Ec, % w | Fc, % w | HS | 100HS/Fc |
|---|---|---|---|---|---|
| REF-1 | 4.0 | 60 | 14 | 4.3 | 30.7 |
| REF-2 | 15 | 60 | 20 | 5.8 | 29.0 |
| REF-3 | 13 | 60 | 28 | 9.2 | 32.9 |

It is seen that the hexane solubles content expressed as a percent of the amount of rubber (100HS/Fc) is substantially improved (lower) for materials of the invention.

We claim:

1. An impact copolymer having a melt flow of about 1 to about 100 dg/min comprising an in situ blend of a polypropylene phase and a copolymerized ethylene and propylene rubber phase formed by copolymerizing ethylene and propylene in the presence of a polypropylene phase, whereby the polypropylene phase may contain up to two weight percent of another olefin, the impact copolymer comprising about 3 to about 60 weight percent of rubber phase with an ethylene content of about 75 to about 95 weight percent, a clarifying agent, and the remainder propylene wherein the copolymer has a clarity of greater than about 20% according to ASTM D-1746-92, the copolymer is cracked to a cracking ratio of between about 1.5 to about 2.5, and the flexural modulus of the impact copolymer is more than 90% of the flexural modulus of the same impact copolymer that has not been cracked.

2. A copolymer according to claim 1 wherein the polypropylene contains up to two weight percent of ethylene.

3. A copolymer according to claim 1 wherein the ethylene content of the rubber phase is between about 78% w and 86% w.

4. A copolymer according to claim 1 wherein the clarifying agent is selected from the group consisting of: bis(3,5-dimethyl benzylidene) sorbitol, bis(p-ethyl benzylidene) sorbitol and bis(p-methyl benzylidene) sorbitol.

5. A copolymer according to claim 1 wherein the intrinsic viscosity ratio is about 1.3 to about 3.0.

6. A copolymer according to claim 1, wherein the clarified copolymer has a flexural modulus at least ten percent greater than the same copolymer without the clarifying agent.

7. A copolymer according to claim 5 wherein the copolymer has a clarity of greater than 45%.

8. A copolymer according to claim 1 wherein the copolymer has a hexane solubles content per 21 CFR 177.1520 when expressed as a percent of the weight percent of the rubber phase in the copolymer is less than about 10%.

9. A copolymer according to claim 1 wherein the melt flow is between about 5 to about 35 dg/min.

10. A cast film comprising the impact copolymer as claimed in claim 1.

11. A molded article comprising the impact copolymer as claimed in claim 1.

* * * * *